United States Patent
Miura (10) Patent No.: US 8,022,674 B2
(45) Date of Patent: Sep. 20, 2011

(54) STATE OF CHARGE CONTROL METHOD AND SYSTEMS FOR VEHICLES

(75) Inventor: Shimpei Miura, Rancho Palos Verdes, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1103 days.

(21) Appl. No.: 11/775,540

(22) Filed: Jul. 10, 2007

(65) Prior Publication Data

US 2009/0015202 A1    Jan. 15, 2009

(51) Int. Cl.
*H02J 7/00* (2006.01)
*B60W 10/24* (2006.01)

(52) U.S. Cl. .................... 320/132; 180/65.29

(58) Field of Classification Search .............. 320/132; 180/62.21, 65.29, 65.21; 903/903, 907
See application file for complete search history.

(56) References Cited

U.S. PATENT DOCUMENTS

| | | | |
|---|---|---|---|
| 5,778,326 A | 7/1998 | Moroto et al. | |
| 6,137,250 A * | 10/2000 | Hirano et al. | 318/376 |
| 6,166,449 A | 12/2000 | Takaoka et al. | |
| 6,344,732 B2 | 2/2002 | Suzuki | |
| 6,362,602 B1 | 3/2002 | Kozarekar | |
| 6,487,477 B1 | 11/2002 | Woestman et al. | |
| 6,600,293 B2 | 7/2003 | Kiduchi | |
| 6,608,482 B2 * | 8/2003 | Sakai et al. | 324/426 |
| 6,687,581 B2 | 2/2004 | Deguchi et al. | |
| 6,856,866 B2 | 2/2005 | Nakao | |
| 7,439,710 B2 * | 10/2008 | Ishishita | 320/132 |
| 7,740,092 B2 * | 6/2010 | Bender | 180/65.29 |

FOREIGN PATENT DOCUMENTS

JP    9168206    6/1997

* cited by examiner

*Primary Examiner* — Richard V Muralidar
*(74) Attorney, Agent, or Firm* — Dinsmore & Shohl LLP (57) ABSTRACT

State of charge control for electric and hybrid vehicles. In one embodiment, a battery may be electrically connected to an electric motor to propel a vehicle. In such an embodiment, during vehicle operation a state of charge of the battery may fluctuate within a given state of charge range and may be regulated to a target state of charge. Such target state of charge may be set below the midpoint of the state of charge range. As the vehicle operates various devices may be controlled to regulate the state of charge to the target. In particular, an electric motor may be employed to lower the state of charge and an internal combustion engine may be employed to raise the state of charge. In other embodiments, regenerative braking, solar power or the like may be employed to raise the state of charge from at or below the target state of charge to the upper state of charge limit.

20 Claims, 12 Drawing Sheets

STATE OF CHARGE CONTROL METHOD AND SYSTEMS FOR VEHICLES

TECHNICAL FIELD

This invention generally relates to systems and methods for improving the state of charge target in a battery. More specifically, one embodiment relates to systems and methods for permanently setting a target state of charge value to less than the midpoint of a state of charge range to thereby improve battery charging capacity, regenerative braking and electric motor operation.

BACKGROUND

Generally, in electric-hybrid vehicles (e.g., gas or fuel cell) an electric motor may be provided to propel the vehicle. At least one rechargeable battery, together with either an internal combustion engine or fuel cell, may provide energy to the electric motor when the motor is employed to propel the vehicle. During extended operation, battery power may be depleted and may require charging. Although immobile charging processes are available, (i.e., coupling the battery to an electrical outlet), such processes typically require the user to discontinue use of the vehicle. Consequently, mobile charging processes are implemented to charge the battery during vehicle operation, such as for example by generating electricity via a fuel cell, via power from the internal combustion engine (e.g., using a generator), and/or via regenerative braking (by converting vehicle momentum into electrical energy). As the battery is charged and discharged, the state of charge may be regulated to extend battery life, optimize battery discharge and charge capacity, and ensure sufficient battery power for the electric motor.

The battery state of charge is typically regulated between a lower limit and an upper limit (i.e., a designated state of charge range) within which the battery state of charge may vary. If the state of charge breaches the upper limit (typically due to overcharging), recharging may be suspended until the battery can be discharged. Conversely, if the state of charge breaches the lower limit (typically due to lengthy electric motor operation), discharging (e.g., use of the electric motor) may be suspended until the battery can be charged. When the battery operates within the designated range, the state of charge is typically regulated to a target state of charge set to the midpoint of the designated range. This midpoint provides equal capacity to charge and discharge the battery, but cannot accommodate extended charging or discharging. Some systems and methods exist can continually regulate and vary the target state of charge based upon predicted vehicle driving conditions to optimize regenerative braking capacity. However, such systems have limited success due to the difficulty in determining and predicting upcoming road conditions. Moreover, such systems can add cost and weight to the vehicle. Accordingly, there is a need to improve the control of a battery state of charge.

SUMMARY

According to one embodiment, a method for controlling a state of charge in a hybrid-electric-vehicle battery is provided. The method may comprise sensing a battery state of charge in an electric-vehicle battery, wherein the battery is operable to provide energy to assist or propel a vehicle and establishing an upper and lower state of charge limit, the upper and lower limit defining a state of charge range. The method may additionally comprise maintaining the battery state of charge within the range. The method may further comprise permanently setting a target state of charge value to less than the midpoint of the state of charge range, regardless of predicted vehicle driving conditions; and regulating the battery state of charge to the target state of charge value. In one embodiment, the lower state of charge limit is about 40% of battery capacity, the upper state of charge limit is about 80% of battery capacity and the target state of charge is less than or equal to about 47% of the battery capacity.

According to another embodiment, a method for increasing the charging capacity of a battery that provides energy to propel a vehicle is provided. The method may comprise establishing an upper and lower state of charge limit, the upper and lower limit defining a state of charge range and permanently setting a target state of charge value to less than the midpoint of the state of charge range, regardless of predicted vehicle driving conditions. The method may additionally comprise charging the battery state of charge to the upper limit through regenerative braking, and adjusting the battery state of charge to the target state of charge value by increasing the propulsion share provided by an electric motor.

According to yet another embodiment, a system for controlling a state of charge in a hybrid electric vehicle battery is provided. The system may comprise an electric motor operative to propel or assist in propelling the vehicle. The system may additionally comprise a battery electrically coupled to the motor, the battery having a state of charge range defined by an upper state of charge limit and a lower state of charge limit, the battery also having a target state of charge permanently set to less than the midpoint of the state of charge range, regardless of predicted vehicle driving conditions. The system may further comprise a controller operative to maintain the battery state of charge within the range and regulate the battery state of charge to the target state of charge value.

BRIEF DESCRIPTION OF THE DRAWINGS

It is believed that the present invention will be better understood from the following description taken in conjunction with the accompanying drawings in which.

DETAILED DESCRIPTION OF ILLUSTRATIVE EMBODIMENTS

Figure 1:
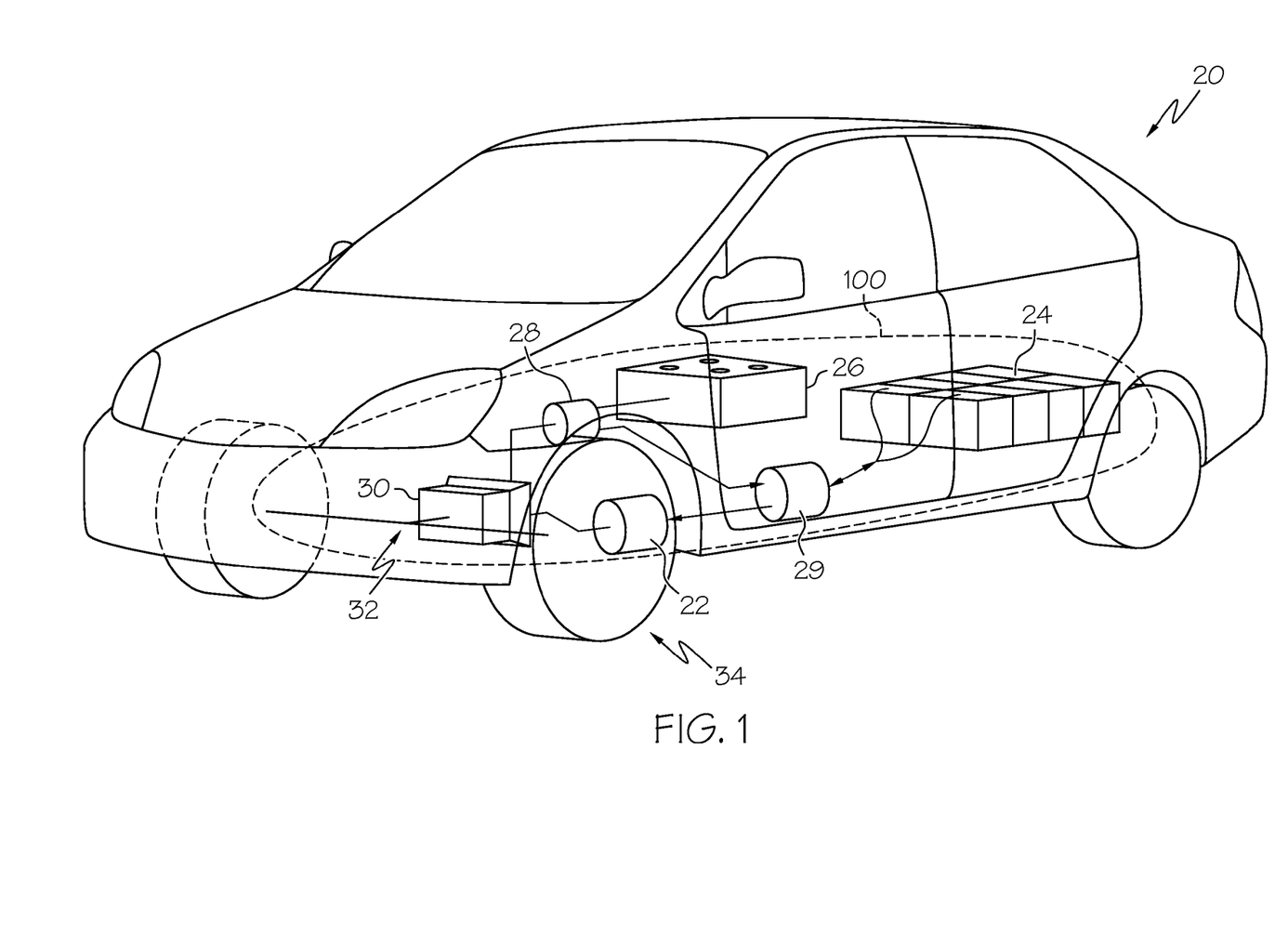
FIG. 1 is a perspective view of a hybrid electric vehicle propulsion system in a vehicle including an internal combustion engine, operating in accordance with one illustrative embodiment of the present invention.
Figure 2:
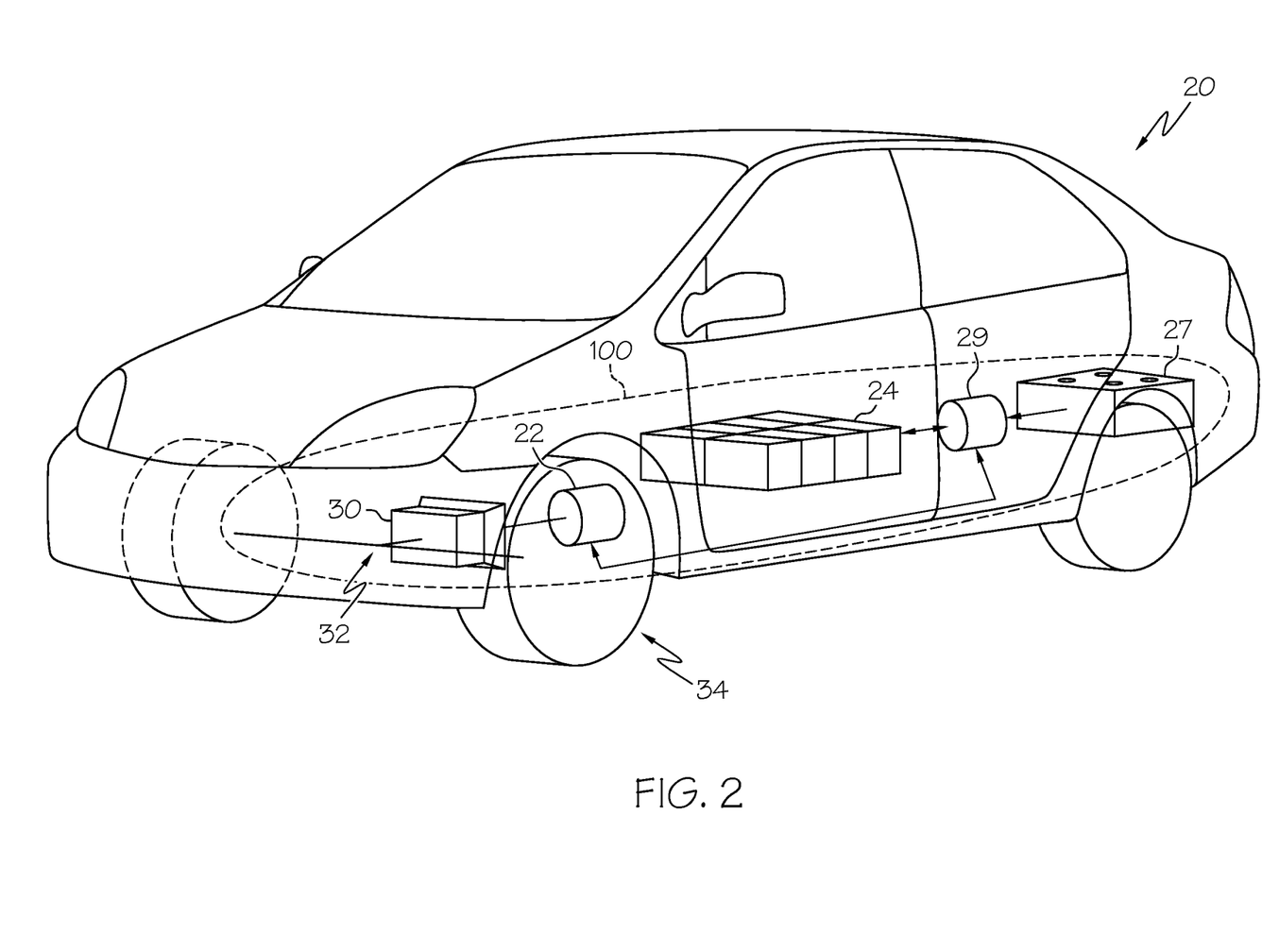
FIG. 2 is a perspective view of an electric vehicle propulsion system in a vehicle including a fuel cell, operating in accordance with one illustrative embodiment of the present invention.

Referring to the drawing figures in detail, FIGS. 1-2 illustrate a hybrid electrical vehicle propulsion system 100 which may be implemented to propel a vehicle 20 (i.e., a hybrid-electric vehicle ("HEV"), such as a gas hybrid or fuel-cell hybrid, or the like) and improve fuel efficiency. As illustrated, the vehicle propulsion system 100 may comprise an electric motor 22, an internal combustion engine 26, a battery 24, a generator 28, a power controller 29, a transmission 30 and a drivetrain 32. As illustrated, battery 24 may be provided within vehicle 20 to store electrical energy (i.e., Coulombs) and transmit electrical energy (i.e. current). Battery 24 may be any rechargeable energy storage device such as, for example, a lithium-ion battery, a lead-acid battery, a nickel-cadmium battery, a nickel-metal hydride battery or the like. As is common, devices, such as a generator 28, may be electrically connected to battery 24 to provide energy to charge the battery 24, as controlled by the power controller 29. Similarly, devices, such as an electric motor 22, may be electrically connected to battery 24 to receive energy and thereby discharge the battery 24. Electrical connection, however, may be achieved using electrical transmission methods now known or hereafter developed. An inverter can be used between the motor and the battery, to convert current from DC to AC to drive the motor, and/or to convert current from AC to DC to decelerate the motor.

In one embodiment, electric motor 22 may be any electromechanical device such as an AC synchronous electric motor, an AC induction electric motor, a brushless DC electric motor, a coreless DC electric motor, or the like. In such an embodiment and as is common, a mechanical member (i.e., a shaft) may operate (i.e., rotate) when electrical energy is applied to electric motor 22 and thus propel the vehicle. Additionally for the same embodiment, electrical energy may be generated when mechanical energy is provided to the mechanical member of electric motor 22, such as when the vehicle is decelerating. Accordingly, mechanical devices may be coupled to and may operate electric motor 22. Therefore, relative to the energy provided (i.e., mechanical or electrical), electric motor 22 may be operative to both charge and discharge battery 24.

As further illustrated, electric motor 22 may be mechanically engaged with transmission 30 to provide mechanical energy to the transmission 30. In an embodiment where the mechanical member of electric motor 22 is a driveshaft, transmission 30 may be operable to change the rotational velocity provided by the mechanical member and output the changed rotational velocity to the drivetrain 32. Typically, transmission 30 may be an automatic transmission commonly used in automobiles. However, in other embodiments, transmission 30 may be any transmission common in vehicles such as a power split device, a manual transmission, a continuous variable transmission, or the like. During electric motor operation, drivetrain 32 may transfer the mechanical energy from transmission 30 to wheels 34 to propel vehicle 20. Drivetrain 32 may comprise a differential, a shaft and two axles as is common in many vehicles. However, other embodiments of drivetrain 32 may include different components and may be configured according to particular vehicle specifications or designs.

During operation of electric motor 22, current may be supplied to the motor 22 thereby diminishing battery energy. Therefore, and as illustrated in FIGS. 1 & 2, electrical vehicle propulsion system 100 may additionally comprise an engine 26 or fuel cell 27 to assist the operation of electric motor 22 and thereby reduce the diminution of battery energy. Engine 26 may be any engine operable to convert fuel into mechanical energy such as for example an internal combustible engine (i.e., gas, hydrogen, propane, diesel, etc.). In one embodiment and as shown in FIG. 1, engine 26 may be coupled to transmission 30 in parallel with electric motor 22 and may provide mechanical energy to transmission 30 in a manner similar to that described for electric motor 22. In such an embodiment, engine 26 may operate independently or concurrently with electric motor 22 to propel vehicle 20. During independent operation, engine 26 may provide the mechanical energy to propel vehicle 20. Since electric motor 22 is not operated, battery energy may be maintained. Such independent operation may occur when motor 22 is inoperable to power vehicle 20 (i.e., insufficient battery power, battery malfunction, etc.). During concurrent operation, engine 26 may operate together with motor 22 thereby reducing the battery energy used to operate the electric motor 22 independently of the engine 26. Such concurrent operation may occur when the mechanical energy from electric motor 22 is insufficient to power vehicle 20 (i.e., demand for excessive acceleration, hauling additional weight, etc.). As a result, engine 26 may lengthen the ability of the battery 24 to operate electric motor 22.

Generator 28 may be any device capable of converting mechanical energy into electrical power such as a dynamo. Generator 28 may be electrically connected to electric motor 22 and/or battery 24 and may be mechanically connected to engine 26. Engine 26 may provide mechanical energy to generator 28 such that electric energy may be supplied to battery 24 and electric motor 22, as controlled by the power controller 29. Power controller 29 may control the electric energy to operate electric motor 22 and/or charge battery 24 via generator 28, as well as the proportion that the vehicle is propelled via engine 26 and via motor 22.

Figure 8A:
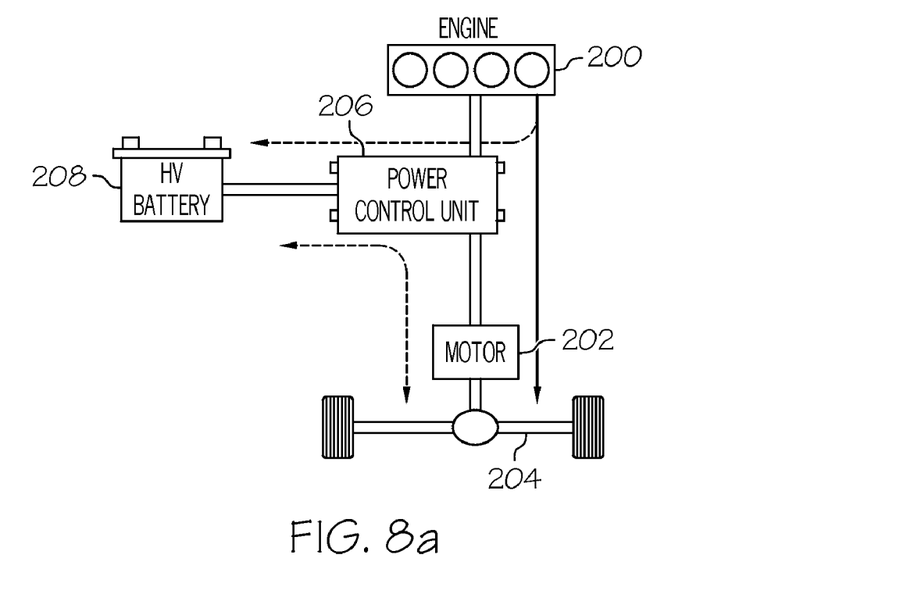
FIG. 8a is a schematic diagram of examples of components of a hybrid vehicle having an internal combustion engine and utilizing state of charge control systems and methods according to one embodiment of the present invention.

During electric motor operation and as described above, battery energy may diminish. As is common in an electric vehicle propulsion system, battery 24 may be charged to ensure battery energy is sufficiently and continuously available to operate electric motor 22 and other electrical devices. Battery charging may be achieved using conventional immobile charging methods now known in the art or hereafter developed. In one embodiment, battery 24 may be recharged by electrically connecting battery 24 to a stationary unit, such as a wall outlet (i.e., charging an EV, charging a Plug-in HEV, etc.). However, battery 24 may be charged using mobile/in-vehicle systems now known or hereafter developed. In one embodiment and as described above, battery 24 may be electrically connected to generator 28 as described above. In such an embodiment, engine 26 may power the generator 28 to charge battery 24 during vehicle operation. In another embodiment, battery 24 may be electrically connected to electric motor 22 where regenerative braking may provide mechanical energy to electric motor 22 to charge battery 24. In such an embodiment, when a vehicle is not being propelled by electric motor 22 or engine 26 (i.e., coasting, brake application, etc.), the vehicle momentum may be converted to electrical energy to charge battery 24. During such an operation, vehicle momentum may continue to rotate the tires 34 while no electrical energy is provided to electric motor 22. Thus, the tires 34 may provide mechanical (i.e. rotational) energy to electric motor 22 via transmission 30 and drivetrain 32. Operation of the mechanical member may employ the electric motor 22 as a generator thereby producing electric energy. Such electrical energy may be transmitted to battery 24 (often using the same electrical connection implemented to power electric motor 22) to charge battery 24. In yet another embodiment, battery 24 may be electrically connected to a solar panel (not shown) affixed to vehicle 20. In such an embodiment, solar power (i.e., sunlight, U.V. rays, etc.) may be provided to the solar panel and converted to electrical energy to charge battery 24. FIG. 8*a* provides an additional example of a configuration that can be utilized in the hybrid electric vehicle embodiment of FIG. 1.

Figure 8B:
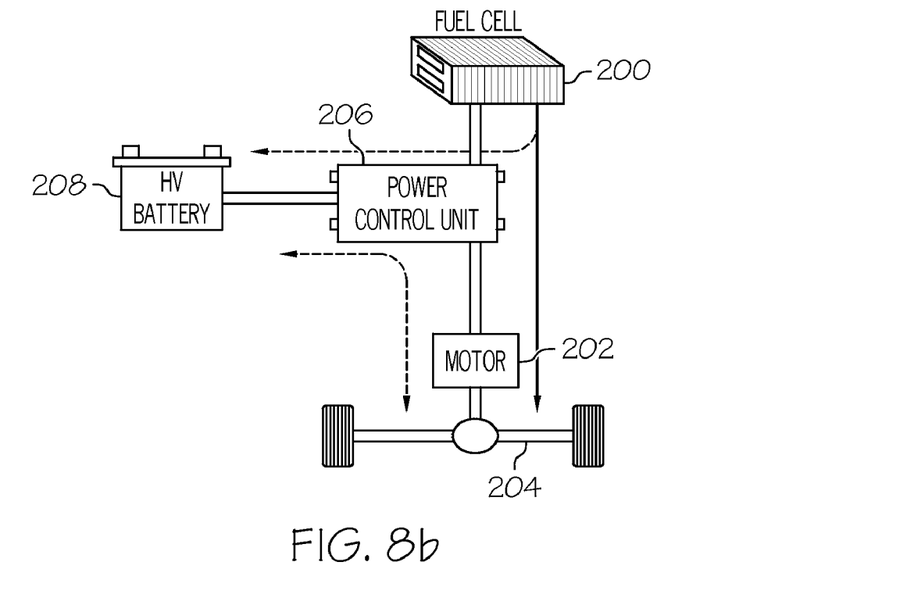
FIG. 8b is a schematic diagram of examples of components of a hybrid vehicle having a fuel cell and utilizing state of charge control systems and methods according to one embodiment of the present invention.

FIG. 2 illustrates another embodiment comprising a fuel cell vehicle. In this embodiment, a fuel cell 27 provides electricity to charge the battery 24, as well as to power an electric motor 22 for propelling the vehicle, as controlled by power controller 29. FIG. 8*b* provides an additional example of a configuration that can be utilized in the fuel cell vehicle embodiment of FIG. 2.

Figure 3:
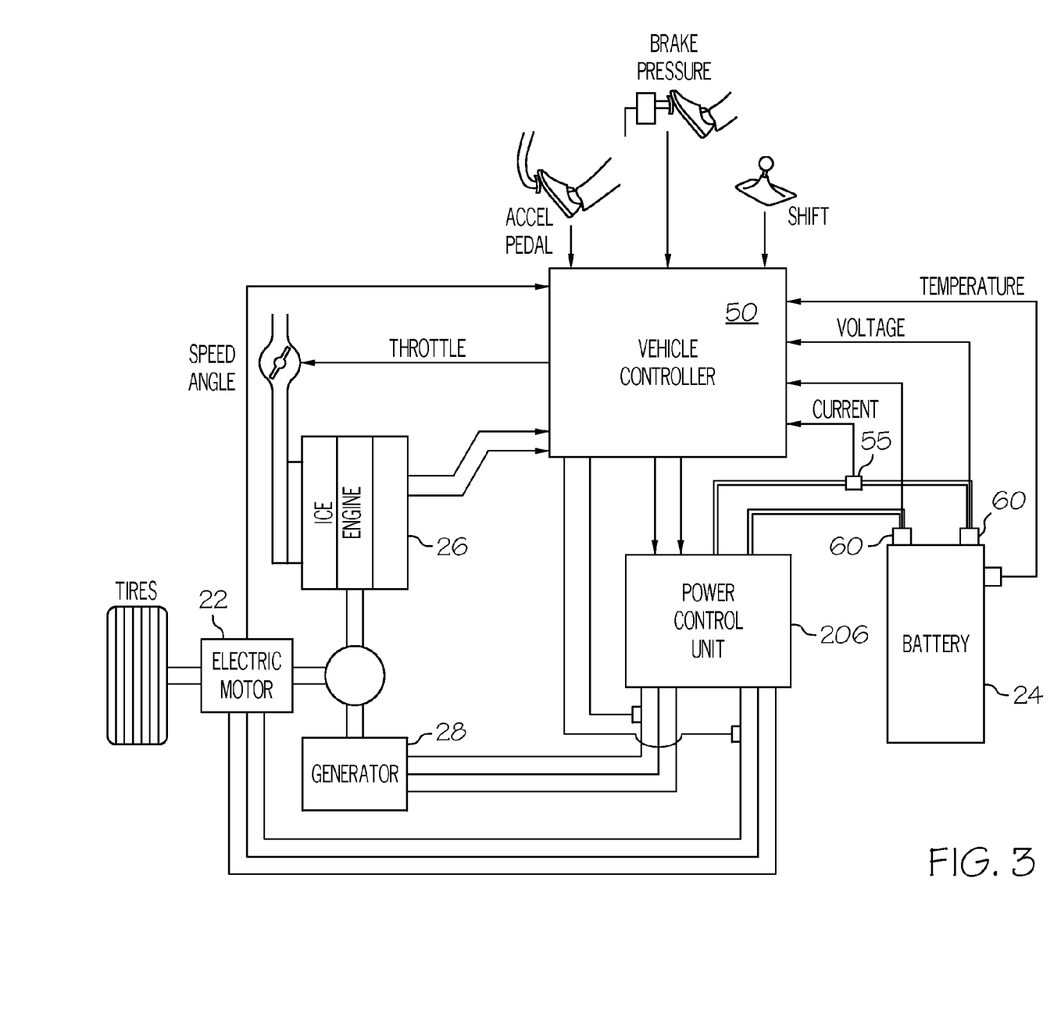
FIG. 3 is a schematic view of a vehicle controller made and operating in accordance with one illustrative embodiment of the present invention, and which can be used with hybrid electric vehicle propulsion systems such as those of FIGS. 1-2.

As illustrated in FIG. 3, a vehicle controller 50 may be provided to measure and/or regulate (described below) the state of charge ("SOC") of battery 24. Typically, battery SOC may represent the amount of energy remaining in battery 24 when compared to the energy in a fully-charged battery. The units can be provided in amp-hours or the like, indicating how much current over a period of time can be provided. As battery 24 is charged and discharged, the SOC and battery capacity may change accordingly. For instance, if the battery is charged, the amount of energy in the battery may increase, thereby increasing SOC. Conversely, if the battery is discharged, the energy in the battery may decrease, thereby decreasing SOC. Accordingly as the SOC changes, the capacity of the battery 24 to charge and discharge may proportionally change. For instance, during charging, the capacity of the battery to accept a charge decreases while the capacity of the battery to discharge increases. Conversely, during battery discharging, the capacity of the battery to accept a charge increases while the capacity of the battery to discharge decreases.

To measure the SOC of battery 24, vehicle controller 50 may monitor vehicle conditions and calculate the SOC from such vehicle conditions. In one embodiment, battery current discharge may be monitored to determine the SOC of battery 24. In such an embodiment, vehicle controller 50 may monitor the current charged to and/or discharged from the battery over a given period of time. Vehicle controller 50 may input the current discharged to an algorithm, look up the current discharged in a look-up table stored in memory, or implement the current discharged in any other data manipulation to determine battery SOC. In another embodiment, battery voltage variance may be monitored to determine the SOC of battery 24. In such an embodiment, vehicle controller 50 may monitor the voltage change over a given period of time. Vehicle controller 50 may input the voltage change to an algorithm, look up the voltage change in a look-up table stored in memory, or implement the voltage change in any other data manipulation to determine battery SOC. In other embodiments, other vehicle conditions, correlative of battery SOC, may be monitored and the SOC calculated therefrom.

As shown in FIG. 3, actual vehicle conditions may be provided to vehicle controller 50 by vehicle systems such as vehicle sensors, road condition sensors, speed sensors, pressure sensors, temperature sensors, acceleration sensors, g-sensors, environment sensors or the like. In one embodiment, battery current measurements may be provided to vehicle controller 50 by current sensors 55. In such an embodiment, current sensors 55 may be any device operative to measure current such as a hall effect device, magnetic toroid or the like. In another embodiment, a battery voltage measurements may be provided to vehicle controller 50 by voltage sensors 60. In such an embodiment, voltage sensors 60 may be any device operative to measure voltage such as an electrostatic meter, a voltage follower circuit, or the like. In other embodiments, other monitors conducive to measuring SOC may provide vehicle conditions to vehicle controller 50. In some embodiments, combinations of battery voltage, current, and temperature may be utilized to determine the battery SOC.

Vehicle controller 50 may be operative to regulate the SOC of battery 24. As described below, the battery SOC may be regulated to a target (i.e., set point). Vehicle controller 50 may be operative to determine the extent to which the SOC should be regulated (i.e., charged or discharged) to achieve the target. In one embodiment, vehicle controller 50 may compare the battery SOC to a predetermined target to determine the amount that the SOC should be changed to achieve that target. In another embodiment, the rate of change of battery SOC may be determined to anticipate whether battery SOC should be changed to avoid divergence from a predetermined SOC target. It should be understood that vehicle controller 50 may perform such calculation/processing via programs, firmware, fuzzy logic, neural networks or other electronic algorithms now known or hereafter developed for determining the extent to which the SOC should be changed.

To regulate the SOC of battery 24, vehicle controller 50 may be operative to control various devices associated with SOC control such as a generator 28, engine 26, electric motor 22, solar panel, inverter (e.g., pulse width modulation (PWM) inverter), battery disconnect, or the like. In one embodiment, vehicle controller 50 may control the operation of electric motor 22 through an inverter. In such an embodiment, vehicle controller 50 may vary duties of inverter PWM control for the electric motor 22 to discharge battery 24 and provide mechanical power to propel vehicle 20. In another embodiment and during regenerative braking, vehicle controller 50 may engage the electric motor 22 and/or a generator 28 to have mechanical energy provided to the battery 24. In such embodiments, the vehicle speed and driver input (e.g., amount of accelerator depression) determines what should be used for the primary vehicle propulsion. The vehicle controller 50 will determine how to charge or discharge the battery by changing the engine load, the motor load, and the generator load, based upon such parameters. If the SOC is high, the controller 50 may assign much less of the task/load to the engine, while if the SOC is too low, then the controller may decide to increase the engine load, decrease the motor load, and increase the generator generation so that the battery charge can be increased. It should be understood that control of such devices may be achieved using common control devices.

Vehicle controller 50 may be any controller common in vehicles such as a Central Vehicle Controller, a Hybrid Vehicle Controller, an Electronic Control Unit, a Telematics Control Unit or the like. In addition, the controller 50 may regulate a separate or integrated power control unit 206 to carry out the desired control. Moreover, vehicle controller 50 may employ communication formats such as J1850, Nexus, SCI, SPI, CAN or the like to communicate and regulate the SOC of battery 24.

It should be understood that electric motor 22, battery 24, engine 26, generator 28, transmission 30 and the particular embodiments described are merely illustrative. Other embodiments are contemplated whereby the inclusion of such devices and their resulting configuration depends upon the particular vehicle configuration or design. In addition, particular embodiments of vehicle 20 are merely illustrative and are not intended to limit vehicle 20.

Figure 4:
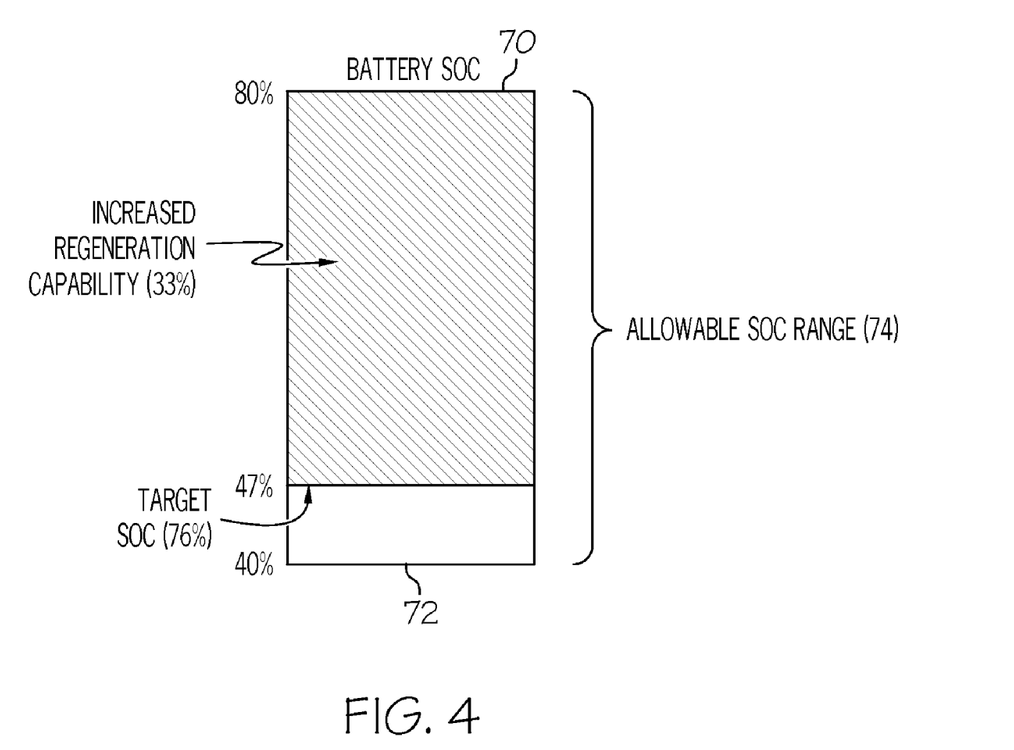
FIG. 4 is a graph depicting a state of charge range and associated target state of charge in accordance with one illustrative embodiment of the present invention.
Figure 5:
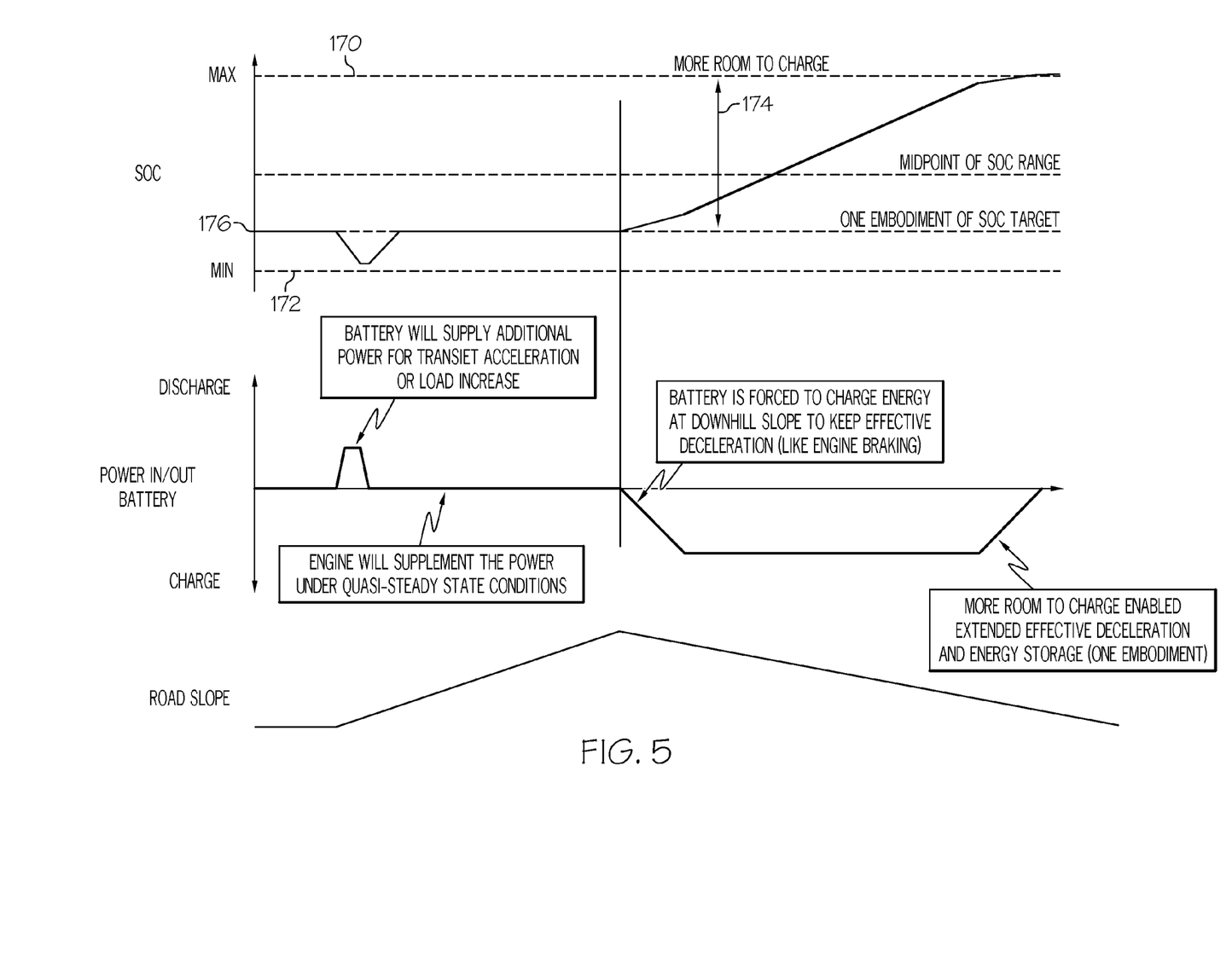
FIG. 5 is a graph depicting a target state of charge continually kept below the midpoint range of a state of charge range, as well as the regulation/adjustment of the battery state of charge to the target, in accordance with one illustrative embodiment of the present invention.
Figure 6:
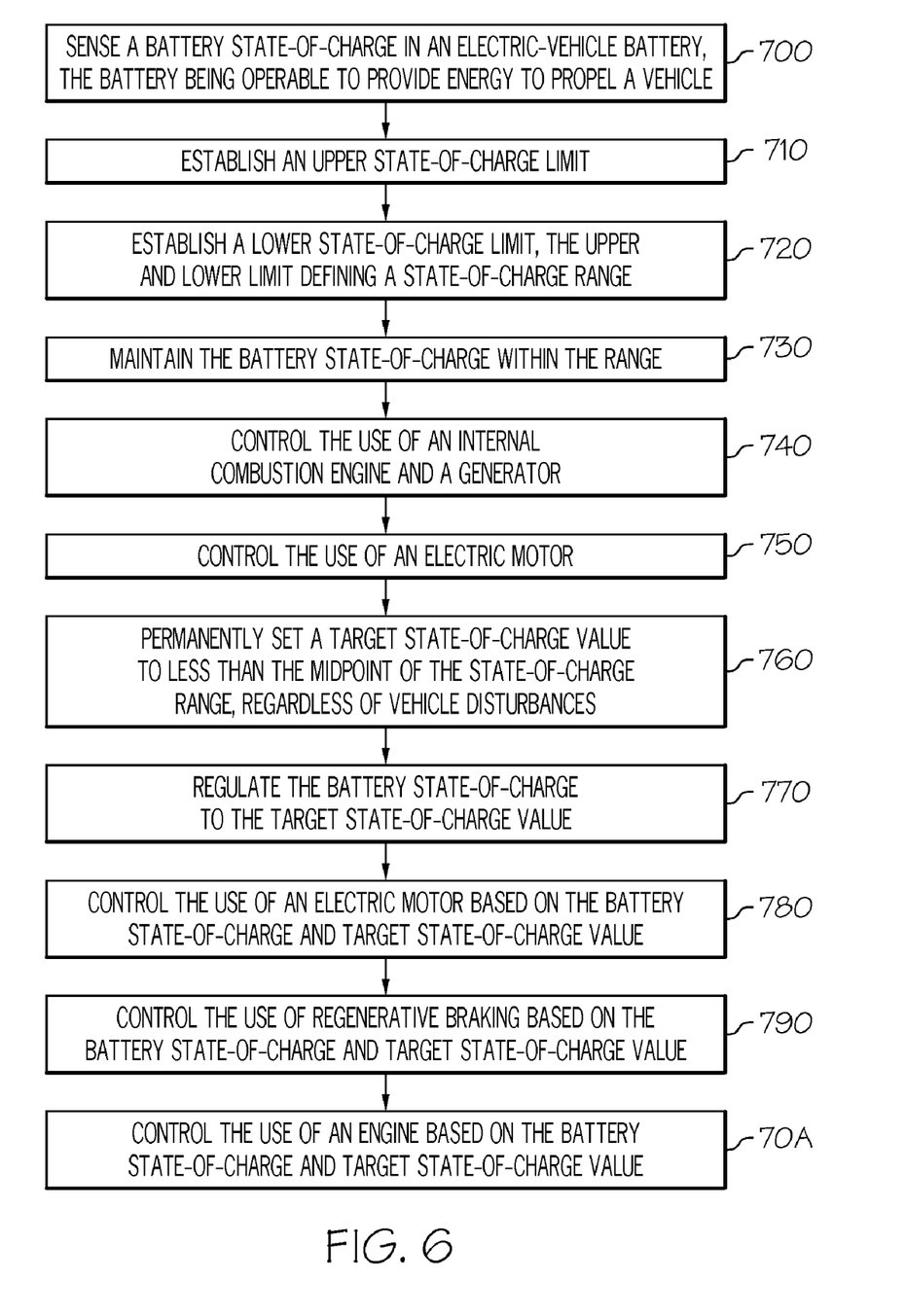
FIG. 6 is a flowchart depicting an example of a method of controlling a state of charge target, in accordance with one embodiment of the present invention.
Figure 7:
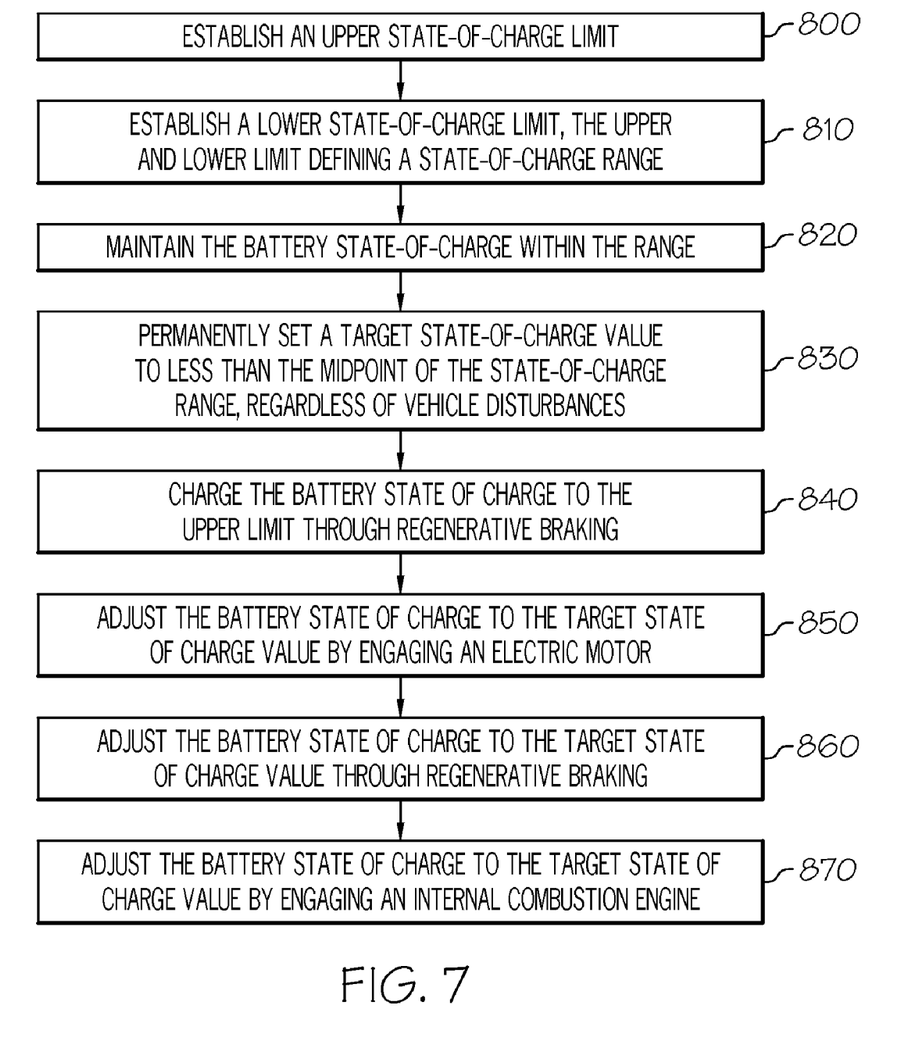
FIG. 7 is a flowchart depicting an example of a method of increasing the charging capacity of a battery, in accordance with one embodiment of the present invention.

Focusing now on the embodiments illustrated in FIGS. 6 and 7 methods for controlling a state of charge target and/or increasing the charging capacity of a battery may be provided. As is common in vehicles and as shown in block 700 of FIG. 6, the battery SOC may be monitored or sensed to ensure the capacity of battery 24 is sufficient to sustain a charge or discharge. As shown in FIGS. 4 & 5, blocks 710 and 720 of FIG. 6 and blocks 800 and 810 of FIG. 7, upper 70, 170 and lower 72, 172 SOC limits may be established to maintain the battery capacity within a SOC range 74, 174 defined by the limits. Such SOC range (within 0-100% capacity full range) may restrict the battery SOC to operate within particular limits that may prevent battery malfunction such as memory effects, saturation, cell deterioration, overheating, or the like. It should be understood however, that SOC range may be established irrespective of battery malfunction prevention and according to other parameters such as a particular user preference, enhanced vehicle performance or the like. Particular values for the SOC range 74, 174 may vary depending upon the particular design or vehicle configuration, but illustrative embodiments are contemplated. In one illustrative embodiment, the upper SOC limit 70, 170 may be about 60%-90% of the capacity of battery 24. In another illustrative embodiment, the lower SOC limit 72, 172 may be about 10%-40% of the capacity of battery 24.

As is illustrated in FIG. 5 and as shown in block 730 of FIG. 6 and block 820 of FIG. 6, the battery SOC may be maintained within a particular SOC range 174. In one embodiment, if the battery SOC breaches the limits associated with the SOC range 174, battery 24 may reject further charging and discharging. For instance, if the battery SOC breaches the lower limit 172, typically due to lengthy electric motor operation, further discharging may be rejected such as by controlling an inverter. Consequently, all or many operations dependent upon battery 24 for energy (i.e., electric motor 22) may be terminated until the battery 24 can be subsequently charged. Conversely, if the battery SOC breaches the upper limit 170, typically due to overcharging, further recharging may be rejected such as by controlling an inverter or like device. Therefore, some recharging processes, such as regenerative braking and solar power, may continue to provide energy for battery 24, but as a result of the breach of the upper 170 limit, this energy would be lost and recharging could not continue until the battery 24 may be subsequently discharged. In another embodiment, if the SOC breaches the limits, charging and discharging devices may be implemented to bring the SOC within the range. For instance, if the battery SOC breaches the lower limit 172, engine 26 may operate a generator 28 to increase the battery SOC as shown in block 740 of FIG. 6. Conversely, if the battery breaches the upper limit 170, electric motor 22 may be employed to decrease the battery SOC as shown in block 750 of FIG. 6. Other devices associated with SOC control may be implemented to control the SOC within the range, such as by changing the inverter's duty which changes the load on the electric motor.

As shown in FIGS. 4 & 5, a target SOC 76, 176 may be set at a particular value or range of values within a particular SOC range 74, 174. As described below, the battery SOC may be regulated/adjusted to the target 76, 176 subsequent to a change in the battery SOC (i.e., a "steady state" SOC). In one embodiment and as shown in FIGS. 4 & 5 and block 760 of FIG. 6 and block 830 of FIG. 7, the target SOC 76, 176 may be permanently set near the lower limit 72, 172 of the SOC range 74, 174 (i.e., below the midpoint of the SOC range). Setting the SOC target may occur by programming or storing the target such that the program, algorithm or firmware can utilize the stored target to attempt to keep the battery near the SOC target level. The particular value of the target SOC 76, 176 may vary according to a vehicle/battery design or configuration, but illustrative embodiments are contemplated. In an illustrative embodiment, the target SOC 76, 176 may be permanently set to be greater than the lower SOC limit 72, 172 by less than 50% of the SOC range 74, 174. In another illustrative embodiment, the target SOC 76, 176 may be permanently set to be greater than the lower SOC limit 72, 172 by less than about 18% of the SOC range 74, 174. In another illustrative embodiment, the target SOC 76, 176 may be permanently set to be about 37% of battery capacity when the SOC range 74, 174 lies between about 20% and about 90% of battery capacity. In yet another illustrative embodiment, the target SOC 76, 176 may be permanently set to be about 47% of battery capacity when the SOC range 74, 174 lies between about 40% and about 80% of capacity.

It has been found that when the SOC target is permanently or continuously set to a value or range of values below the midpoint of the SOC range, vehicle operation may be improved. In one embodiment, it has been found that additional charging capacity may be provided by such an SOC target for extensive recharging processes, such as extended regenerative braking and solar power. Typically, during typical electric motor operation, the battery may be only discharged briefly, thereby minimally decreasing the state of charge. Therefore, subsequent extended regenerative braking (i.e., a long downhill descent), may result in a loss of charging energy since the upper state of charge limit is reached quickly and further charging is suspended. In such an embodiment, the difference between the upper limit 70, 170 of the SOC range 74, 176 and the target 76, 176 may be greater than the difference between the lower limit 72, 172 of the SOC range 74, 174 and the target 76, 176. The difference between the upper limit 70, 170 and the target 76, 176 may provide additional charging capacity not provided by a target set at the midpoint of the SOC range 74, 174. Therefore, and as illustrated in block 840 of FIG. 7, when the battery SOC is at the target 76, 176, continuous charging processes may be provided for a longer period of time to charge battery 24 to the upper limit 70, 170 of the SOC range 74, 174. Thus, lost energy (i.e., energy provided to battery 24 after the upper limit 70, 170 of the SOC range 74, 174 is achieved) may be minimized. Although, the difference between the lower limit 72, 172 and the target 76, 176 is decreased by setting the target 76, 176 below the midpoint of the SOC range 74, 174, vehicle 20 operation may not be adversely affected. Typically, when the battery SOC is at the target 76, 176, electric motor 22 is implemented to propel vehicle during instances where engine 26 may provide poor fuel efficiency (i.e., acceleration of vehicle 20 from rest). Subsequent to the period of poor fuel efficiency, engine 26 may operate to overtake operation of electric motor 22. In many instances, and as described above, operation of electric motor 22 may be brief before engine 26 overtakes electric motor operation thus discharging battery 24 only slightly. Therefore, the minimal discharge capacity created by setting the target below the midpoint may not affect operation of electric motor 22 since the discharge may not be great enough to breach the lower limit 72, 172 of the SOC range 74, 174. Consequently, additional charging capacity may be provided by a SOC target set to a value or range of values below the midpoint of the SOC range 74, 174 without sacrificing battery or vehicle performance. In some embodiments, setting the SOC target below the midpoint of the SOC can entail, for example, use of the following equations: SOC target=lower SOC limit +<[50%*(upper SOC limit−lower SOC limit)] or SOC target=upper SOC limit −>[50%*(upper SOC limit−lower SOC limit)]. In additional embodiments, the SOC target is set at a level at the factory and not changed during the operation over the lifetime of the vehicle.

In another embodiment, additional battery discharge may be provided when the SOC target 76, 176 is set to a value or range of values below the midpoint of the SOC range 74, 174 and the battery is fully charged. As discussed more fully below, when the battery SOC is above the target 76, 176, electric motor 22 may be employed to regulate the SOC to return to the target. Therefore, when battery 24 has been fully charged (i.e., upper limit 70, 170 of the SOC range 74, 174 has been reached as illustrated by block 840 of FIG. 7), electric motor 22 may be operated to discharge battery to the target SOC 76, 176. Since more discharge is permitted when the target SOC is lowered, electric motor 22 may operate longer thereby delaying and reducing the need for a subsequent charge or engine operation.

When the SOC target is set to a value or range of values below the midpoint of the SOC range 74, 174, monitoring vehicle driving conditions to dynamically change the target SOC may not be necessary. Therefore, in one embodiment, monitoring changes in road conditions (i.e., road slope change, coefficient of friction change, bank change or the like), changes in vehicle conditions (i.e., change in temperature, change in fuel efficiency, change in slope, change in the coefficient of friction, change in the road bank or the like), changes in battery conditions (i.e., charge memory effects, a change in battery acid temperature, cell failure or the like) or the like may not be necessary to improve vehicle operation. Moreover, predicting or determining driving conditions, which can be difficult, may not be necessary.

As shown in FIG. 5, block 770 of FIG. 6 and blocks 850, 860 and 870 of FIG. 7, as battery 24 charges and discharges, the battery SOC may be regulated/adjusted to the target SOC 176. However, to appropriately operate devices and permit charging during vehicle operation (i.e., to operate electric motor, to capture regenerative braking power, etc.), the SOC may diverge away from the target 176 within the SOC range 174. Subsequent to such SOC divergence away from the target 176, the SOC may be regulated/adjusted to return to the target 176. The duration of time between SOC divergence and any subsequent regulation/adjustment of the SOC may depend upon the occurrence of particular events, the lapse of a designated time, or the like. In one embodiment, battery SOC may be regulated subsequent to a breach of a limit 170, 172 of the SOC range. In such an embodiment, the battery SOC may be permitted to diverge away from the target 176 within the designated SOC range 174. When the SOC breaches the SOC range limits 170, 172, either due to overcharging or excessive discharging, the battery SOC may be regulated to the target SOC 176. In another embodiment, battery SOC may be regulated when a specified period of time lapses after a change in SOC. In such an embodiment, when divergence from the target SOC 176 is sensed, regulation of the SOC to the target 176 may begin after the lapse of the specified period. The specified period of time may be any time period that may comport with a particular design or configuration.

As illustrated in FIGS. 6 & 7 charging and discharging processes/devices may be controlled to regulate/adjust the SOC. In an embodiment where the battery SOC diverges above the target, devices that discharge battery 24 may be employed. For instance and as shown, in block 780 of FIG. 6 and block 850 FIG. 7, inverter PWM duty is increased so that electric motor propels the vehicle (upon an indication by the user that the vehicle is to be propelled, such as depression of the accelerator) when the SOC is above the target. Inverter PWM duty may remain increased until the battery discharges to the target SOC 76, 176. Implementation of such electric motor may alleviate use of engine 26 and may thereby increase fuel efficiency. In an embodiment where the battery SOC diverges below the target by a certain amount, processes/devices that charge battery 24 may be employed. For instance, and as shown in block 790 of FIG. 6 and block 860 of FIG. 7, regenerative braking may be employed, if available, to charge battery 24. Alternatively, and as illustrated in block 70A of FIG. 6 and 870 of FIG. 7, the torque of the engine 26 may be increased in order for the generator 28 to provide electrical energy to battery 24 to increase SOC to the target. Such processes/devices may remain increased until the battery SOC converges to the target SOC.

In the case of recharging devices which are energy efficient or do not require expenditure of the vehicle fuel, such as regenerative braking devices or solar devices, the algorithm in some embodiments may permit the charging of the battery to continue well above the SOC target 176 and all the way to the SOC limit 170, 172 for so long as the recharging circumstances (braking) are present (such as shown in FIG. 5). In these embodiments, because the SOC target 176 is relatively low, much capacity remains to take advantage of such available "free" energy. It has been found in accordance with the invention, that greater capacity to recharge than to discharge can take batter advantage of such energy and devices while still maintaining adequate capacity to discharge and providing good performance.

FIG. 8a is a schematic diagram of examples of components of a hybrid vehicle having an internal combustion engine and utilizing state of charge control systems and methods according to one embodiment of the present invention. In this example, the vehicle comprises an internal combustion engine 200 and an electric motor 202 which power the axle 204. Energy for the motor 202 is supplied by the hybrid vehicle battery 208. A power control unit 206 controls how much power is supplied by the engine 200 and the motor 202 to the axle 204. The power control unit also controls the recharging of the battery 206 from power from the engine 200 and generated power from the motor 202. The power control unit can utilize the state of charge control methods and systems described above, such as those shown in FIGS. 6 and 7 for example, to control the state of charge based upon a target.

FIG. 8b is a schematic diagram of examples of components of a hybrid vehicle having a fuel cell and utilizing state of charge control systems and methods according to one embodiment of the present invention. This example is like that of FIG. 8a, but instead of an engine and motor supplying power, a fuel cell 200 and motor 202 supply the power.

Figure 9:
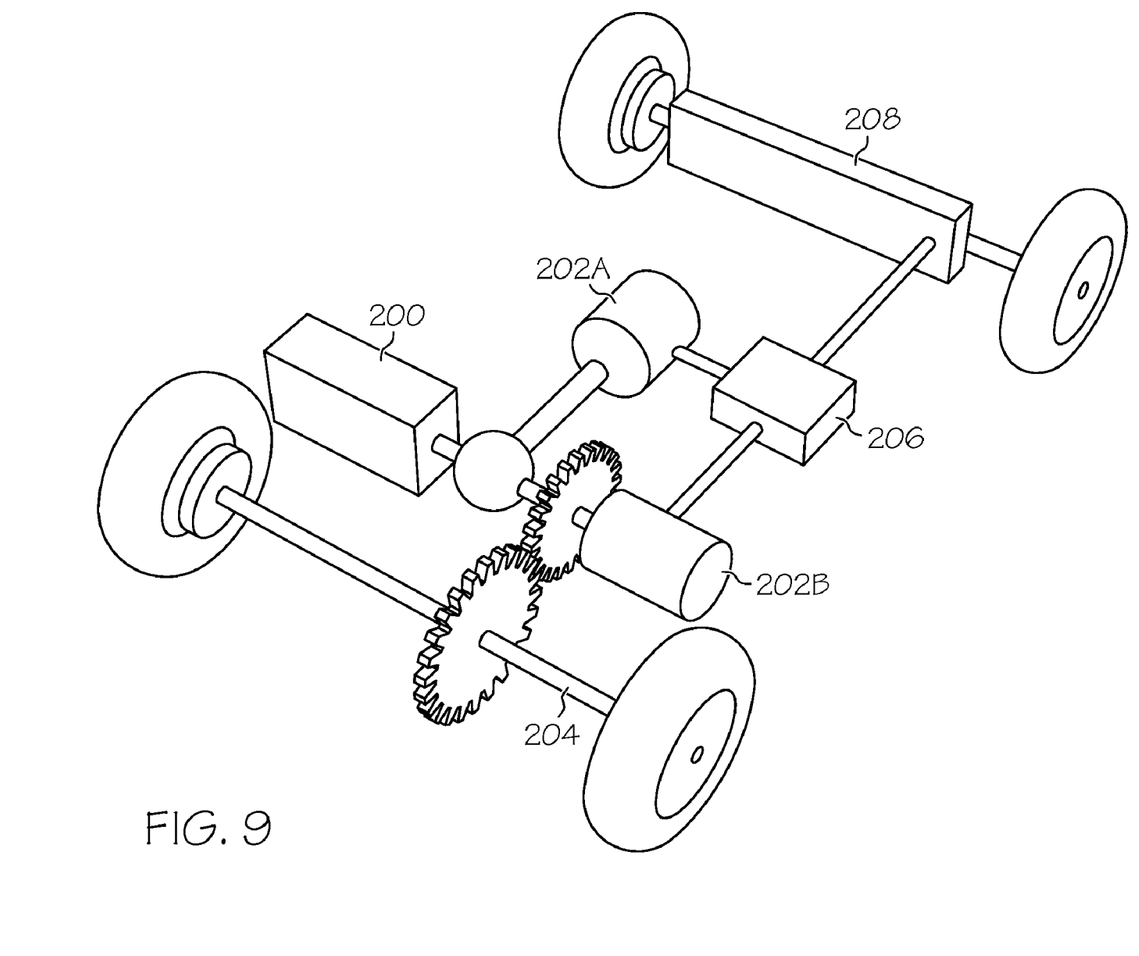
FIG. 9 is a more detailed schematic illustrating the embodiment of FIG. 8a in more detail.

FIG. 9 is a more detailed schematic illustrating the embodiment of FIG. 8a in more detail. In this example, the motor 202 is shown as a pair of motor/generators (MG's) 202A and 202B. The MG 202A generates electricity from power from the engine 200, and controls the engine speed, while the MG 202B drives the wheels and axle 204 and allows for regeneration of energy through regenerative braking. Thus, both MG 202A and 202B can charge the HV battery 208. The PCU 206 controls the distribution of the load between MG 202B and engine 200, and the discharging and charging of the battery 208. The power control unit can utilize the state of charge control methods and systems described above, such as those shown in FIGS. 6 and 7 for example, to control the state of charge based upon a target.

Figure 10:
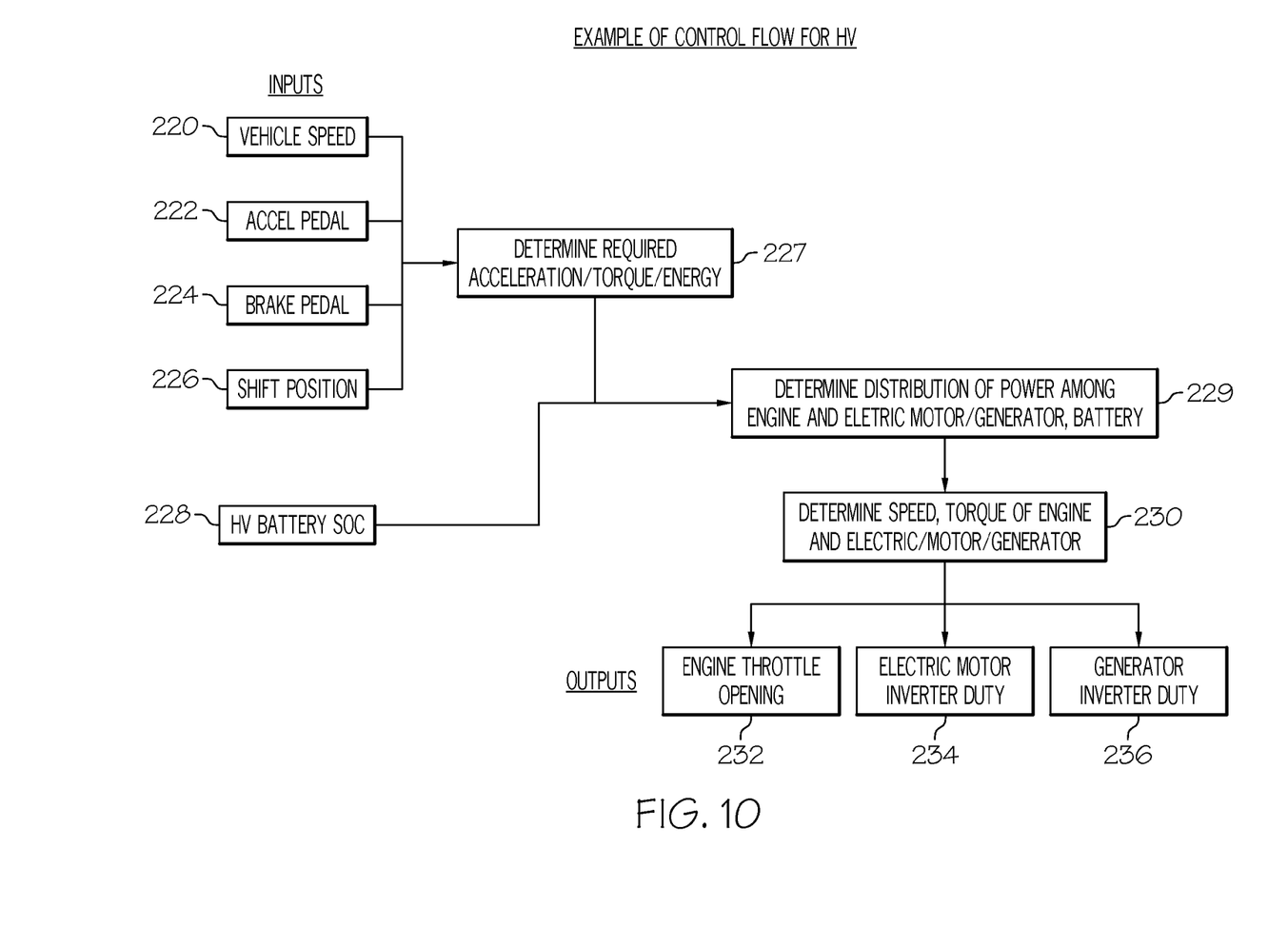
FIG. 10 is a flow diagram illustrating an example of the control flow for a hybrid vehicle having an internal combustion engine, which can be utilized in conjunction with state of charge control systems and methods according to one embodiment of the present invention.

FIG. 10 is a flow diagram illustrating an example of the control flow for a hybrid vehicle having an internal combustion engine, which can be utilized in conjunction with state of charge control systems and methods according to one embodiment of the present invention. In this example, sensors provide signals, such as vehicle speed, accelerator depression, brake pedal depression, and shift position, as shown at blocks 220, 222, 224, and 226. As shown at block 227, the signals are received and the required acceleration, torque, and energy is determined. The HV battery state of charge is also sensed, as shown at block 228. Using the HV battery state of charge, the target state of charge (as set by the above methods/systems) and the required acceleration/torque/energy, a distribution of power is determined for distributing power among the engine, the electric motor/generator, and the battery, as shown at block 229. The speed and torque provided by the engine and electric motor/generator are then determined at block 230, and compared to the desired distribution of power that was determined at block 229. The throttle opening, the electric motor inverter duty and the generator inverter duty are then controlled, as shown at blocks 232, 234, and 236.

Figure 11:
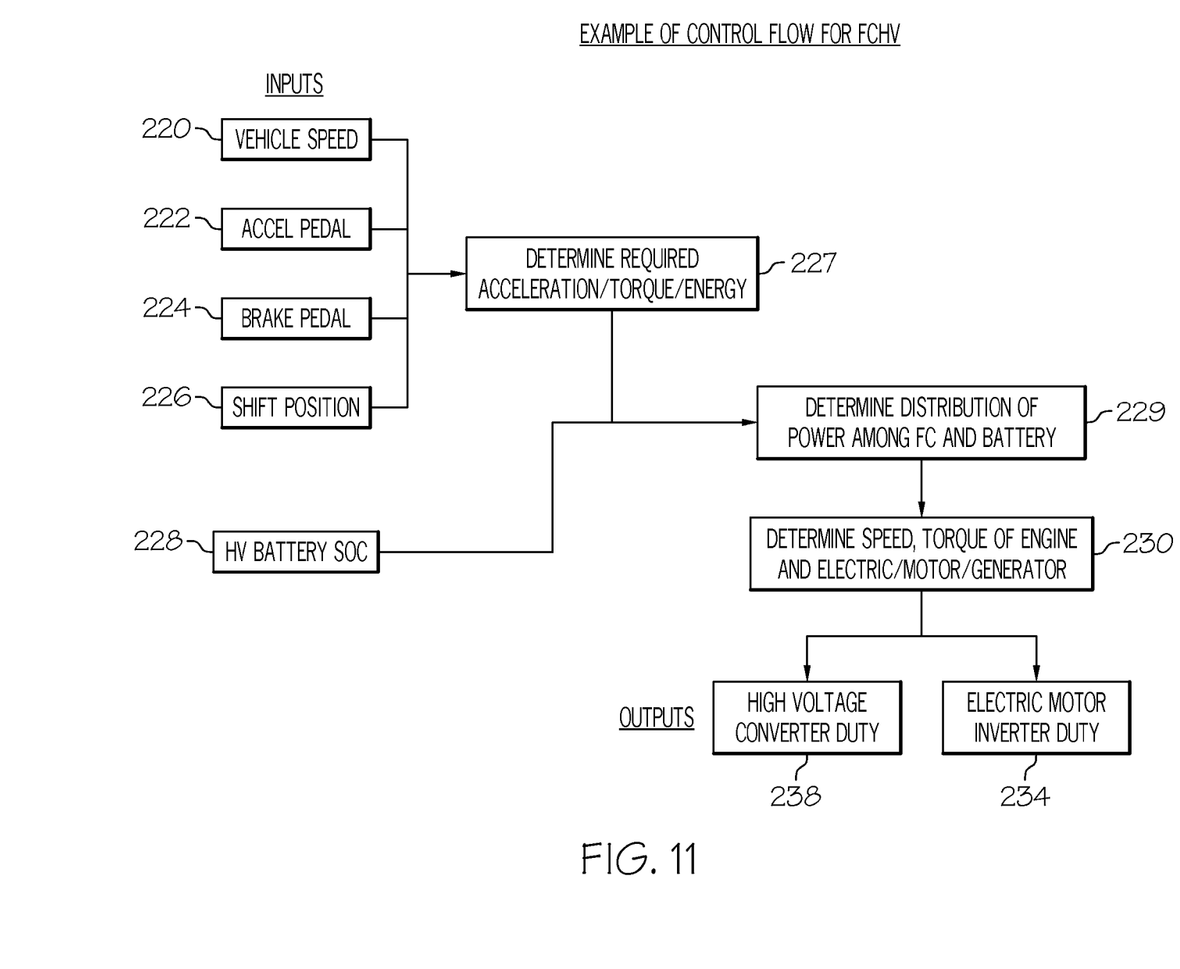
FIG. 11 is a flow diagram illustrating an example of the control flow for a hybrid vehicle having fuel cell, which can be utilized in conjunction with state of charge control systems and methods according to one embodiment of the present invention.

FIG. 11 is a flow diagram illustrating an example of the control flow for a hybrid vehicle having fuel cell, which can be utilized in conjunction with state of charge control systems and methods according to one embodiment of the present invention. This example is similar to that of FIG. 10, except that block 229' determines the distribution of power among a fuel cell and the battery. Moreover, instead of controlling an engine throttle, a motor inverter, and a high voltage converter duty are controlled by the method, as shown at blocks 234 and 238.

Figure 12:
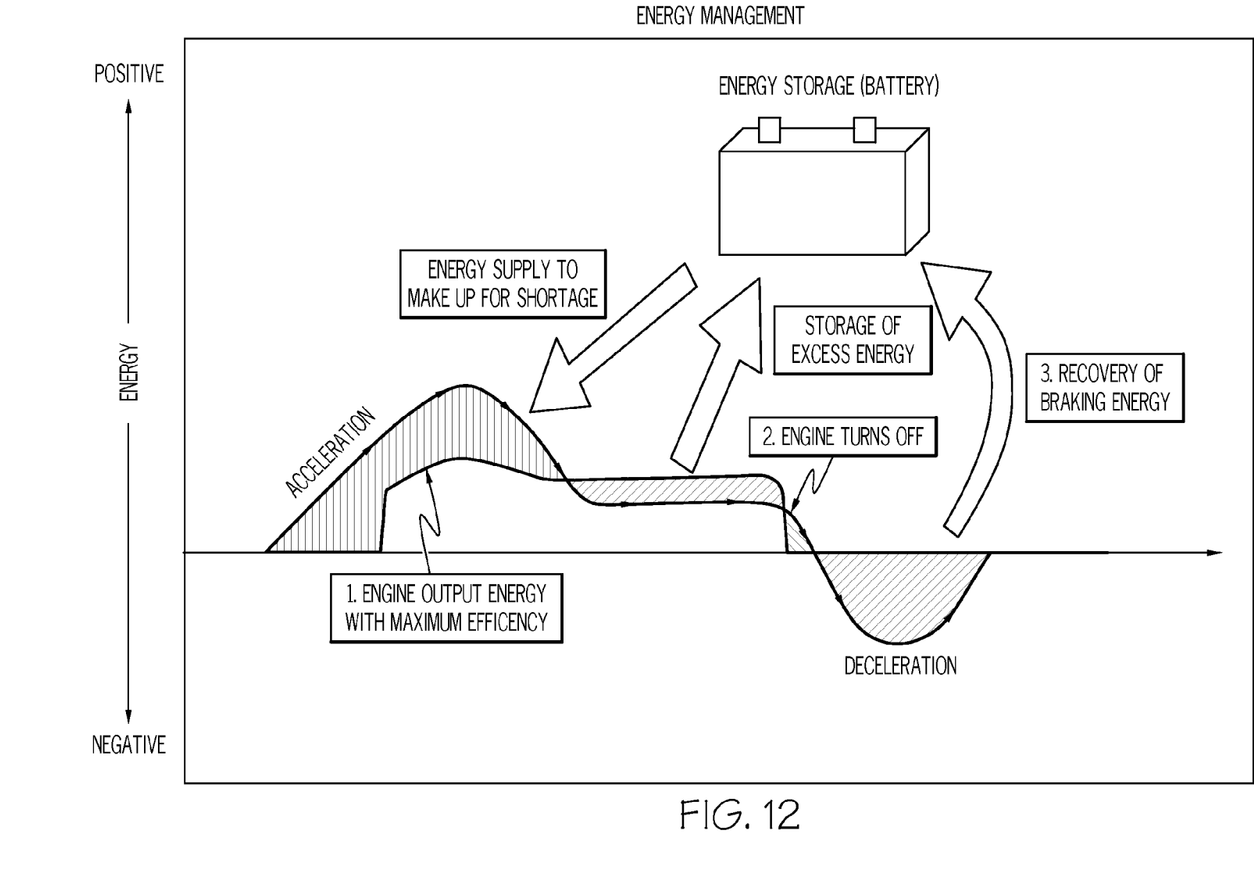
FIG. 12 is a schematic diagram illustrating an example of energy management techniques which can be utilized in conjunction with state of charge control systems and methods according to one embodiment of the present invention.

FIG. 12 is a schematic diagram illustrating an example of energy management techniques which can be utilized in conjunction with state of charge control systems and methods according to one embodiment of the present invention. In this example, the energy storage of the battery is controlled during acceleration and deceleration of the vehicle. During an increasing speed period 241, the energy of the battery is used to help power the vehicle. During a steady speed period 240 excess energy from the engine is used to charge the battery, and during a deceleration period 242, the engine turns off and braking energy is used to charge the battery. The state of charge control methods and systems described above, such as those shown in FIGS. 6 and 7 for example, can be utilized to control the state of charge based upon a target.

The foregoing description of the various embodiments of the invention has been presented for the purposes of illustration and description. It is not intended to be exhaustive or to limit the inventions to the precise forms disclosed. Many alternatives, modifications and variations will be apparent to those skilled in the art of the above teaching. For example, the method for controlling a target SOC in accordance with the present invention may establish an upper and lower limit to an SOC range, maintain the SOC within the range, set a target SOC below the midpoint of the range and regulate the SOC to the target. Accordingly, while some of the alternative embodiments of the system for controlling a target SOC have been discussed specifically, other embodiments will be apparent or relatively easily developed by those of ordinary skill in the art. Moreover, although multiple inventive aspects and features have been described, it should be noted that these aspects and features need not be utilized in combination in any particular embodiment. Accordingly, this invention is intended to embrace all alternatives, modifications, combinations and variations.

What is claimed is:

1. A method for controlling a state of charge in a hybrid electric vehicle battery, comprising:
    sensing a battery state of charge in a hybrid electric vehicle battery, the battery being operable to provide energy to propel a vehicle;
    accessing an upper state of charge limit of the hybrid vehicle battery, wherein the upper state of charge limit is from about 60% to about 90% of a capacity of the hybrid electric vehicle battery;
    accessing a lower state of charge limit of the hybrid vehicle battery, wherein the lower state of charge limit is from about 10% to about 40% of the capacity of the hybrid electric vehicle battery, the upper and lower limit defining a state of charge range of the hybrid vehicle battery;
    storing a target state of charge value of the hybrid vehicle battery which has been set at less than the midpoint of the state of charge range, wherein the target state of charge value is kept at that level independent of predicted vehicle driving conditions; and
    regulating the battery state of charge based upon the target state of charge value and the upper and lower limits.

2. The method as recited in claim 1, wherein the regulating operation includes controlling the use of an internal combustion engine and an electric motor.

3. The method as recited in claim 1, wherein the regulating operation includes charging the battery to the upper state of charge limit and controlling an electric motor to reduce the state of charge to the target.

4. The method as recited in claim 1, wherein the upper state of charge limit is about 80% of the battery capacity.

5. The method as recited in claim 1, wherein the lower state of charge limit is about 40% of the battery capacity.

6. The method as recited in claim 1, wherein the target state of charge value is less than about 47% of the battery capacity when the state of charge range is from about 40% to about 80% of the capacity of the hybrid vehicle battery.

7. The method as recited in claim 1, wherein the midpoint of the range is about 60% of the battery capacity.

8. The method as recited in claim 1, wherein the target state of charge is less than about 55% of the battery capacity.

9. The method as recited in claim 1, wherein the target state of charge is less than about 50% of the battery capacity.

10. The method as recited in claim 1, wherein the target state of charge is greater than the lower SOC limit by less than about 50% of the SOC range.

11. The method as recited in claim 1, wherein the target state of charge is greater than the lower SOC limit by less than about 25% of the state of charge range.

12. The method as recited in claim 1, wherein the target state of charge is greater than the lower SOC limit by less than about 20% of the state of charge range.

13. A method for increasing the charging capacity of a battery that provides energy to propel a vehicle, comprising:
 establishing an upper state of charge limit of the battery in a vehicle battery control system, wherein the upper state of charge limit is from about 60% to about 90% of a capacity of the battery;
 establishing a lower state of charge limit of the battery in the vehicle battery control system, wherein the lower state of charge limit is from about 10% to about 40% of the capacity of the battery, the upper and lower limit defining a state of charge range;
 setting a target state of charge value of the battery in the vehicle battery control system to less than the midpoint of the state of charge range, wherein the target state of charge is kept at that level independent of predicted vehicle driving conditions; and
 configuring the vehicle battery control system to charge the battery state of charge to the upper limit through regenerative braking and to discharge the battery state of charge toward the lower target state of charge limit by engaging an electric motor, wherein the battery is charged and discharged based on a sensed state of charge of the battery and the target state of charge value.

14. The method as recited in claim 13, wherein the upper state of charge limit is about 80% of the battery capacity.

15. The method as recited in claim 13, wherein the lower state of charge limit is about 40% of the battery capacity.

16. The method as recited in claim 13, wherein the target state of charge value is less than or equal to about 47% of the battery capacity.

17. A system for controlling a state of charge in a vehicle battery, comprising:
 an electric motor operative to propel the vehicle;
 a battery electrically coupled to the electric motor; and
 a battery control system, the battery control system having a predetermined state of charge range defined by an upper state of charge limit of the battery, the upper state of charge limit defining a maximum battery charge that should not be exceeded, and a lower state of charge limit of the battery, the lower state of charge limit defining a minimum battery charge to be maintained, the battery control system also having a target state of charge of the battery permanently set to less than the midpoint of the state of charge range, the battery control system including:
  a controller operative to maintain the battery state of charge within the range and regulate the battery state of charge to the target state of charge value, wherein the upper state of charge limit is from about 60% to about 90% of a capacity of the battery and the lower state of charge limit is from about 10% to about 40% of the capacity of the battery.

18. The system as recited in claim 17, wherein the upper state of charge limit is about 80% of the battery capacity and the lower state of charge limit is about 40% of the battery capacity.

19. The system as recited in claim 17, wherein the target state of charge value is less than about 47% of the battery capacity.

20. The system as recited in claim 17, wherein the target state of charge is greater than the lower SOC limit by less than about 40% of the state of charge range.

* * * * *